United States Patent
Fahrenbach

(10) Patent No.: US 7,541,686 B2
(45) Date of Patent: Jun. 2, 2009

(54) WIND POWER GENERATOR WITH BIASED TRANSMISSION ARRANGEMENT

(75) Inventor: Jürgen Fahrenbach, Aichelberg (DE)

(73) Assignee: Schuler Pressen GmbH & Co. KG, Goppingen (DE)

( * ) Notice: Subject to any disclaimer, the term of this patent is extended or adjusted under 35 U.S.C. 154(b) by 0 days.

(21) Appl. No.: 12/070,171

(22) Filed: Feb. 16, 2008

(65) Prior Publication Data
US 2008/0203730 A1    Aug. 28, 2008

(30) Foreign Application Priority Data
Feb. 22, 2007    (DE) .................. 10 2007 008 761

(51) Int. Cl.
*H02P 9/04*    (2006.01)
(52) U.S. Cl. ........................................ 290/44
(58) Field of Classification Search ............ 290/44
See application file for complete search history.

(56) References Cited

U.S. PATENT DOCUMENTS

| 7,038,330 | B2 * | 5/2006 | Rosebrock et al. | 290/44 |
| 7,095,128 | B2 * | 8/2006 | Canini et al. | 290/44 |
| 7,259,471 | B2 * | 8/2007 | Basteck | 290/43 |
| 7,436,083 | B2 * | 10/2008 | Shibata et al. | 290/44 |

* cited by examiner

*Primary Examiner*—Nicholas Ponomarenko
*Assistant Examiner*—Iraj A Mohandesi
(74) *Attorney, Agent, or Firm*—R. S. Lombard; K. Bach

(57) ABSTRACT

In a wind power generation installation comprising a rotor with rotor blades mounted on a tower and connected via a transmission to a generator for generating electric power, an electric machine operable as a motor is also connected to the transmission for applying a driving torque to the transmission so as to bias the transmission so as to hold the gears of the transmission in constant engagement in order to prevent the detrimental effects of torque variations on the gears of the transmission.

3 Claims, 5 Drawing Sheets

WIND POWER GENERATOR WITH BIASED TRANSMISSION ARRANGEMENT

CROSS-REFERENCE TO RELATED APPLICATION

The application claims the priority benefits of German Application No. 10 2007 008 761.8 filed Feb. 22, 2007.

BACKGROUND OF THE INVENTION

The invention relates to a wind power generator, particularly for inland locations.

Wind power plants with a tower, a nacelle supported on top of the tower and a rotor rotatably supported by the nacelle are well known. The rotor is coupled to at least one electric generator which is disposed in the nacelle and which converts the rotation of the rotor into electrical power. Between the rotor and the generator there is generally a transmission which converts the slow rotor speed to a high generator speed.

To this end, it is also known to provide for a branching of the power. Reference is made in this respect to U.S. Pat. No. 6,731,017. This publication shows a rotor connected to a transmission input gear, which drives several counter shaft gears. From the countershafts, pairs of gears drive generators which supply electric power.

During actual operation of a wind power generator varying forces are effective on the rotor blades depending on the locally prevailing wind speeds. Particularly at inland locations, the rotor may be exposed to rapidly changing wind gusts.

The changing wind speeds can easily cause the rotor blades to vibrate. Rotor blade vibrations or oscillations result in torque variations at the hub of the rotor. They can become so large that generator connected to the rotor may, particularly during operation with a low electrical load, have such a momentum that torque reversals may occur in the transmission. Because of the unavoidable play between the tooth surfaces of the engaged gears, this can result in oscillation impacts on the gears which may result in transmission damage.

Also, often variations of the torque and of the angular speed of the hub occur when a rotor blade passes through the culmination point during its rotation. At this point, the gravity based rotor blade bending is reversed because of the change of direction of the gravity force effective on the rotor blade. This induces rotor blade vibrations on hub vibrations, that is speed variations of the hub which lead to variations in the electric power generation and detrimentally affect the power supply quality.

The rotor vibrations may lead to a reduction of the power supply quality. The rotational vibrations occurring at the rotor shaft result in corresponding power oscillations of the generators and ultimately in electric power oscillations.

It is therefore, the object of the present invention to provide an improved wind energy generating installation.

SUMMARY OF THE INVENTION

In a wind power generation installation comprising a rotor with rotor blades mounted on a tower and connected via a transmission to a generator for generating electric power, an electric machine operable as a motor is also connected to the transmission for applying a driving torque to the transmission so as to bias the transmission so as to hold the gears of the transmission in constant engagement in order to prevent the detrimental effects of torque variations on the gears of the transmission.

The electric energy required for the operation of the motor can be derived from the power distribution system, an energy storage device and/or an electric intermediate circuit to which power is supplied by the generator of the wind power generation installation. The result is that this transmission is prebiased, so that rotor blade vibrations no longer result in a torque reversal at the gears driving the generator. As a result, the chances that gear teeth are breaking off or other transmission damages occur are substantially reduced. It is even possible to use weak dimensioned transmissions which results in material and weight savings without detrimentally affecting the reliability of the transmission.

The, at least occasional, operation of the electric machine as a motor makes it, furthermore possible, to actively counteract rotor vibrations. To this end, upon detecting a rotor oscillation a corresponding oscillation can be introduced into the hub of the opposite phase. Here for, the electric machine operable as a motor can be used. It provides for an active damping of the rotor blade vibration or oscillation. With the elimination of rotor blade vibration, a detrimental effect on the power supply quality by rotor blade vibrations can be counteracted. Resonance build-up of rotor blade vibrations is prevented which would otherwise detrimentally affect the power supply quality. This is particularly true if for the energization of the motor an energy storage device is used. It is also true, however, at least in a resonance build-up situation that is when by the opposite coupling the vibrations are eliminated, if no such storage device is available.

In a particular embodiment of the invention, the rotor blades of, for example, a three-blade rotor are turned to different characteristic frequencies. In this way, it is prevented that the counter-coupling of the rotor vibration of a particular rotor blade results in the excitation of another rotor blade. But, it is also possible to tune all the rotor blades to the same characteristic frequency and to dampen rotor blade vibrations only insofar as they occur at the hub as a super-imposed results of the vibration of all the rotor blades. Although this procedure does not minimize the stresses at the individual rotor blades, it improves at least the power supply quality and, as mentioned earlier, prevents an excessive load on the gears of the transmission as could otherwise be the case because of torque reversals.

Further improvements of the wind energy installations can be achieved if the electric machine is provided with an energy storage arrangement, such energy storage arrangements may include buffer capacitors, fly wheel storage devices or other energy storage arrangements. The energy storage arrangement may, for example, be connected to an intermediate circuit to which the generator and also the electric machine which can be selectively operated as an electric motor are connected. There may also be provided, various electric machines of which each has its own intermediate circuit with its own energy storage arrangement.

In a particular embodiment of the invention, at least one sensor is associated with the rotor for maintaining the rotor speed and/or rotor speed changes or other accelerations. This sensor is preferably connected to a control unit which controls the electric machine which is operable as an electric motor in such a way that rotor vibrations are minimized.

For improving the power supply quality not only the above-mentioned electric or electro-mechanical energy storage devices, such as capacitors or fly wheel storage devices may be used, but it is also possible to couple energy storage devices directly with rapidly rotating shafts which are driven by the rotor. For example, one or all of the generators or electric machines may be provided with fly wheels. It is also possible to provide the transmission with a gear structure which directly drives a flywheel.

Further features of the invention are apparent from the accompanying drawings.

DESCRIPTION OF THE PREFERRED EMBODIMENTS

Figure 1:
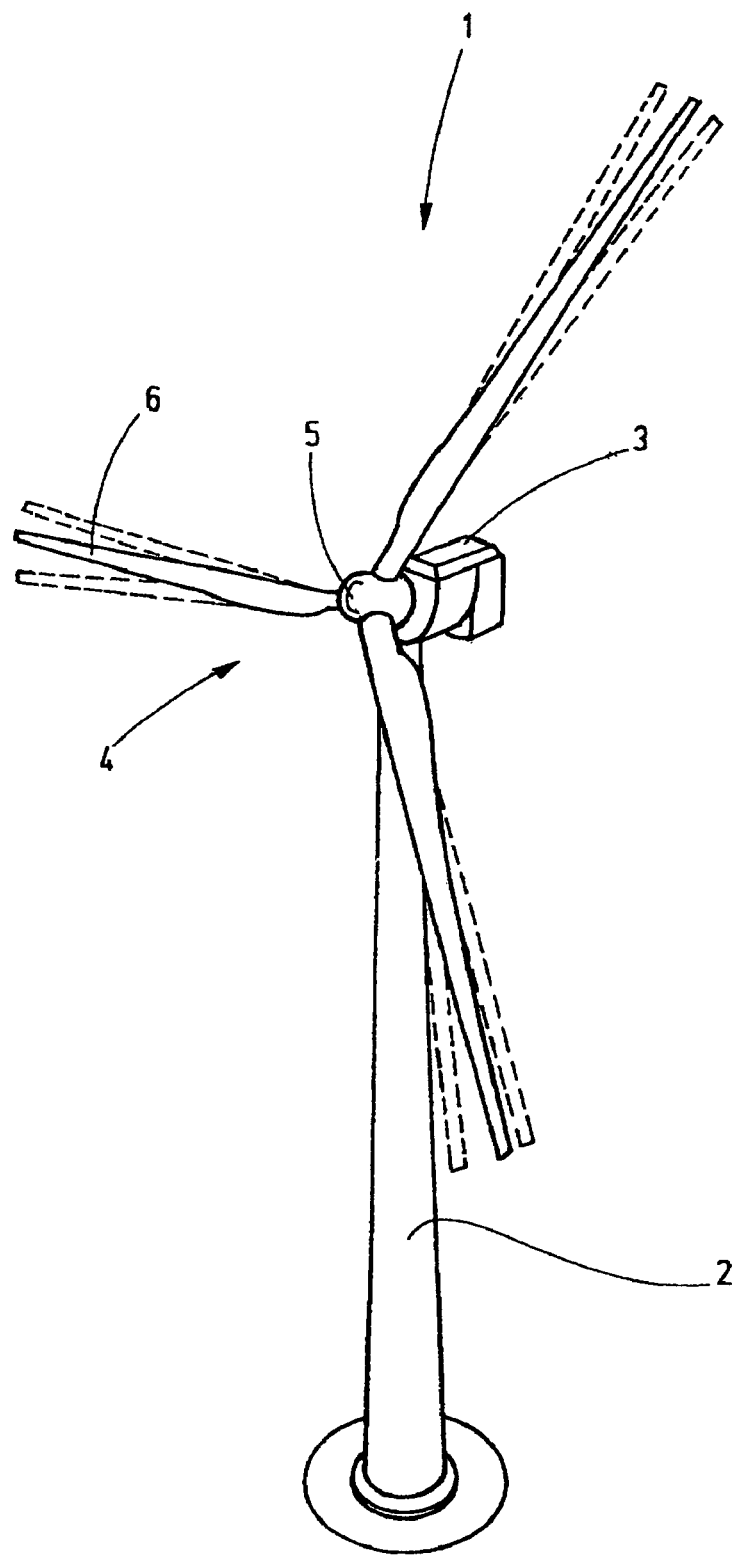
FIG. 1 shows a wind power generating installation in a perspective schematic representation.
Figure 2:
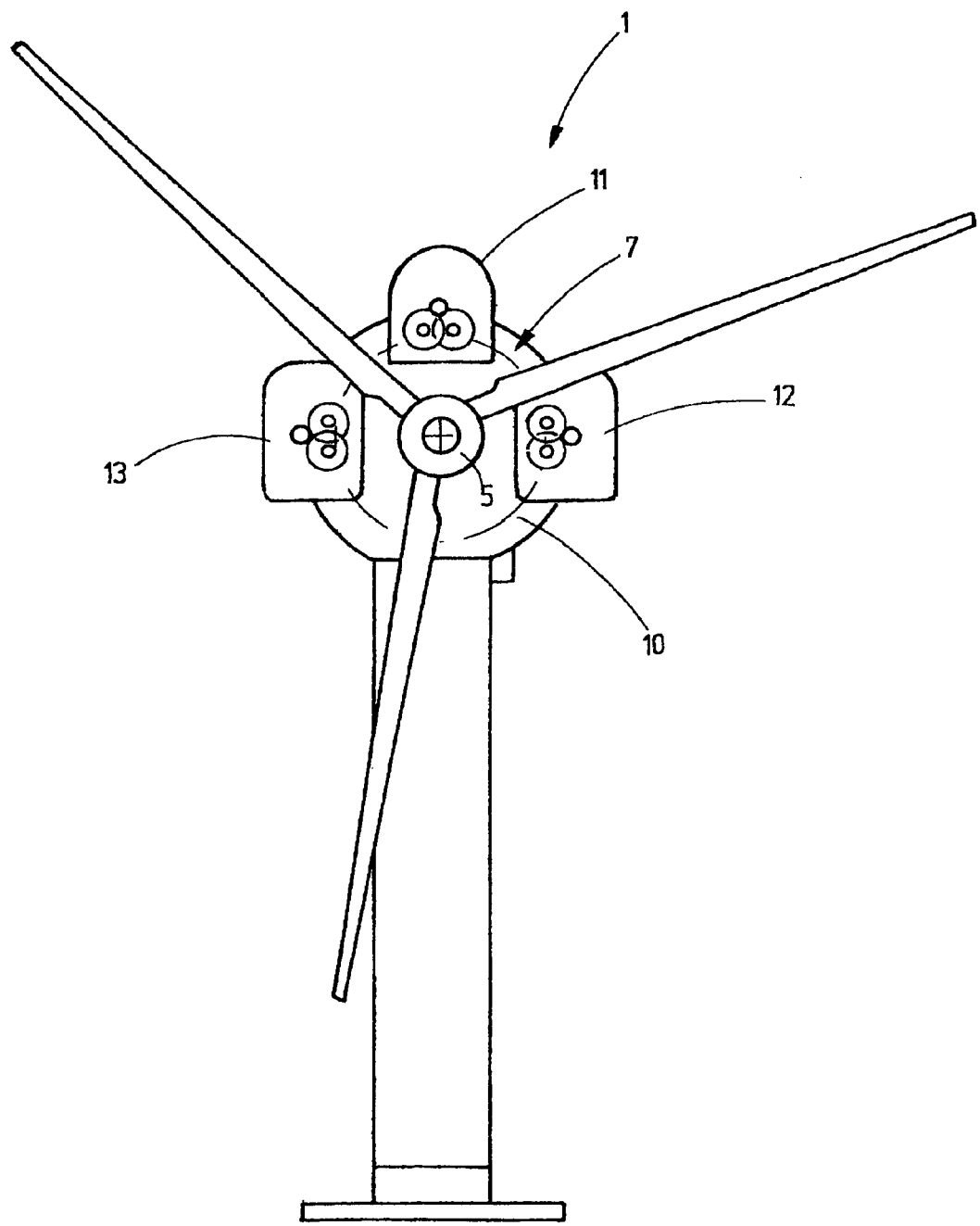
FIG. 2 shows the arrangement for the transmission of the power from the rotor to the electric machines in principle in a frontal schematic representation.

FIG. 1 shows a wind power installation 1 with a tower 2, a nacelle 3 supported on the top of the tower 2 so as to be rotatable about a vertical axis and a rotor 4 which is supported rotatably about an essentially horizontally axis. The rotor 4 includes three blades 6 which extend essentially radially from a shaft or hub 5 of the rotor 4. As apparent from FIGS. 2 and 3, the rotor 4 drives via a transmission 7 at lest one electric generator 8 and at least one additionally electric machine 9, which is capable of operating as an electric generator as well as an electric motor. To this end, the transmission 7 includes a power branching arrangement. Several partial transmissions are connected to a central gear 10 so as to form transmission branches 11, 12, 13. By way of these transmission branches 11, 12, 13 the slow rotor speed is converted to a fast speed of, for example, 1000 revolutions per minute or more. To the output shafts of the transmission branches 11, 12, 13, the generator 8, the electric machine 9, as well as possibly additional generators (generators 14, FIGS. 4 and 5) are connected.

If desired, the generators 8, 14 and the electric machine 9 can be connected to encoders 15, 16, 17 which transmit the actual angular positions of the generator 8, 14 and, respectively, of the electric machine 9 to a control unit 18. The control arrangement 18 may be arranged in or at, the nacelle 3 or in the tower 2 or at the foot of the tower. Furthermore, the nacelle 3 may include additional electrical equipment, such as a transformer 19 and various converters 20, 21, 22, 23, 24, 25. For example, each generator 8, 14 and the electric machine 9 which moves as a motor/generator may be provided with a controlled inverted converter 23, 24, 25. These inverted converters 23, 24, 25 are each connected to DC intermediate circuits 26, 27, 28. The DC intermediate circuits 26, 27, 28 are connected by way of the converters 20, 21, 22 to the transformer 19 which, again, may be connected to the public power supply. The converters 20 to 25 are preferably controlled by the control unit 18. To the DC intermediate circuits 26, 27, 28 energy storage devices, for example, in the form of capacitors 29, 30 or a fly wheel storage device 31 may be connected. For example, the fly wheel storage device 31 may be connected to the DC intermediate circuit 26 which is connected to the motor-generator 9 via the converter 23.

Additional energy storage can be achieved by the connection of one or several fly wheels to the transmission 7. For example, a fly wheel 32 may be connected to the transmission branch 11.

Figure 3:
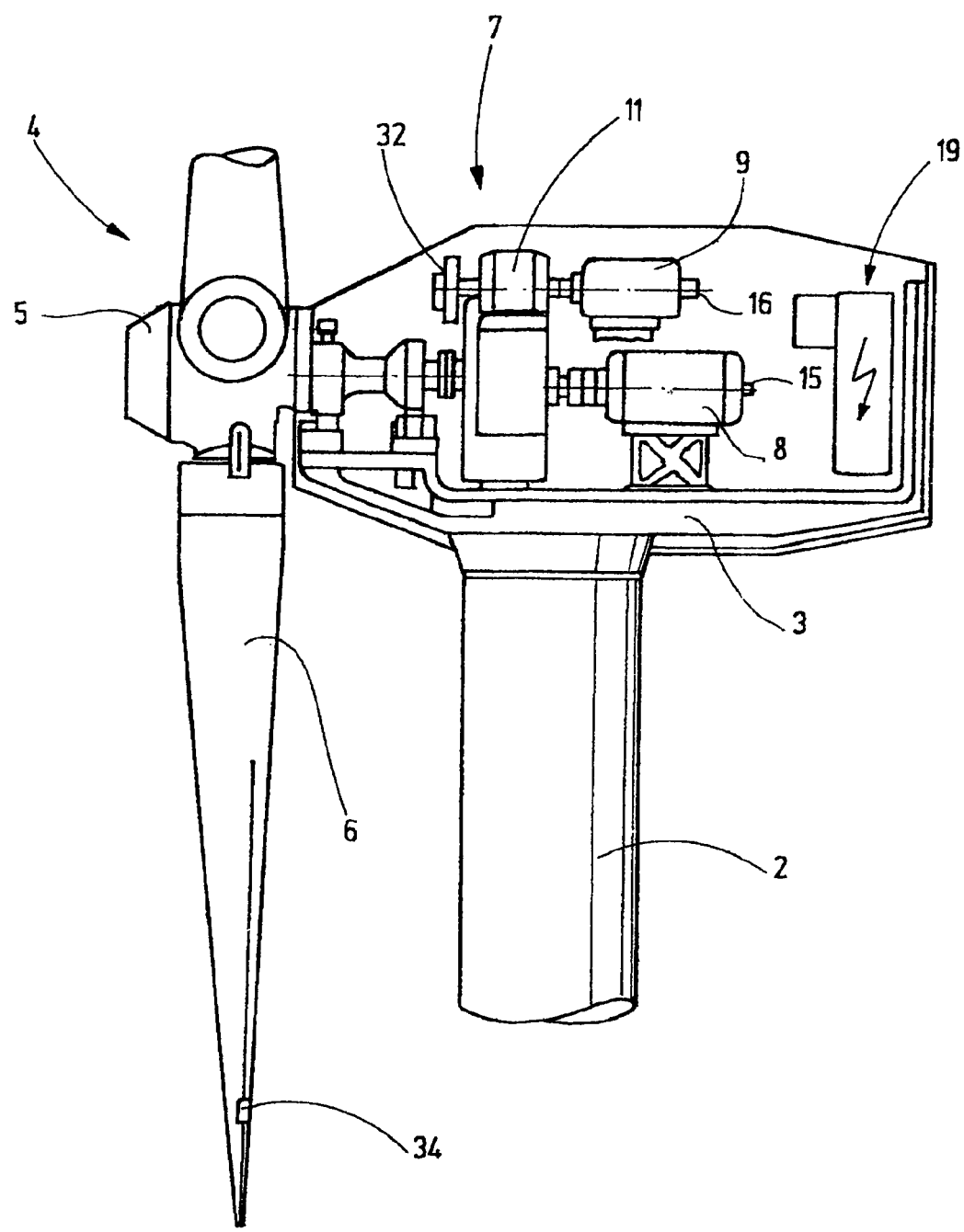
FIG. 3 shows the wind power installation in a partially sectional schematic side view.
Figure 4:
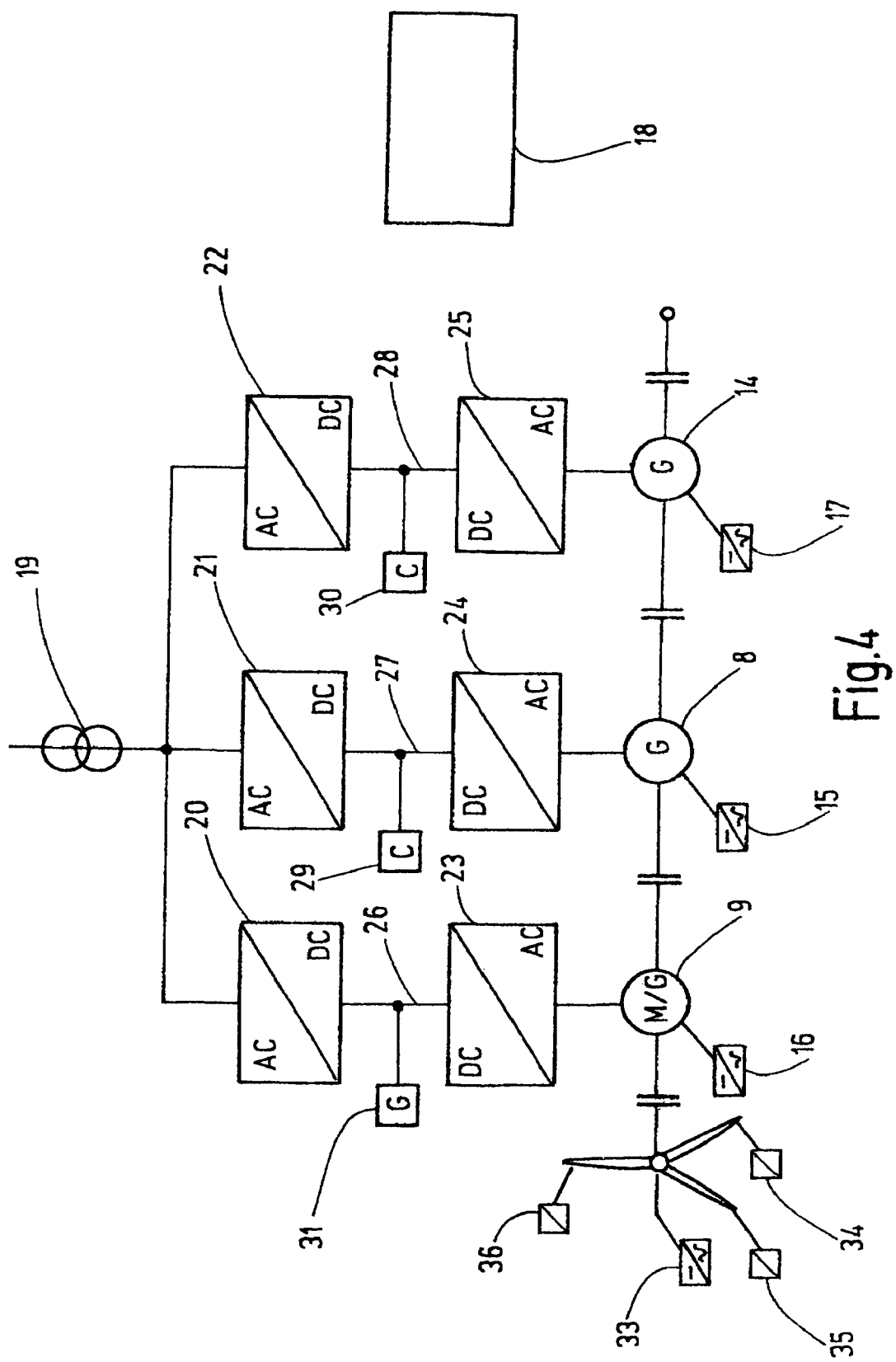
FIG. 4 shows the generators of the wind power installation and the electrical current arrangement in a block diagram; and, FIG. 5 shows an alternative embodiment of the wind power installation on the basis of an electric block diagram.

Further, additional, sensors may be provided as apparent from FIGS. 3 and 4. For example, the rotor 4 may be connected to an encoder 33 which transmits the angular position of the rotor 4 to the control device 18. Furthermore, the rotor blades 6 may be provided with acceleration sensors 34, 35, 36 for detecting blade vibrations. The acceleration sensors 34, 35, 36 are preferably arranged in the vicinity of the blade tips. They are additionally connected to the control unit 18.

The wind power generation installation 1 as described herein operated as follows:

First, an average wind strength is assumed where the wind power generator 1 does not deliver maximum power. With a uniform wind strength the rotor 4 runs relatively uniformly. The generators 8, 14 generate electric current which is rectified by the converters 24, 25 and then supplied, via the DC intermediate circuits 27, 28, to the converters 21, 22. The converters 21, 22 produce a current with the frequency of the power supply which is supplied to the public power supply via the transformer 19. The electric machine 9 can run idling and is, for example, inactivated.

During operation in which the rotor 4 does not rotate uniformly as it may occur in connection with small wind gusts or with different wind speeds in lower and higher air layers through which the rotor blades 6 pass it may be expedient to increase the torque transmitted via the transmission branches 12, 13. This is achieved by a magnetic pre-tensioning of the transmission 7. Such a magnetic pre-tensioning is obtained by operating the electric machine 9 as a motor. It operates in the same sense as the rotor 4, that is, in the sense of driving the rotor. Part of the energy generated by the generators 8, 14 which is present at the input of the transformer 18 is branched off and is conducted via the converter 20 and the intermediate circuit 26 and the converter 23 to the motor 9, which now additionally drives the rotor. At the same time, the motor 9 is effectively an additional load for the generators 8, 14. In this way, the torque effective on the transmission branches 12, 13 is increased. In this way, the flanks of the teeth of the gears of the transmission branches 12, 13 remain constantly in contact with one another and a torque reversal in the transmission branches is avoided even when the rotor torque is subjected to large torque changes. Otherwise, a torque reversal could occur when the generators 8, 14 are operating at low load, that is, momentarily without being braked and the rotor 4 does not generate a drive torque for a short period. Such torque reversals may also occur shortly when rotor blade oscillation occur. With the pre-tensioning of the transmission branches 12, 13 and ultimately also the transmission branch 11, mechanical transmission play present in the transmission is made ineffective which substantially increases the life of the transmission.

It is, furthermore, possible to obviate rotor blade vibrations by an intelligent control of the electric machine 9. The rotor blade vibrations occur, for example, at the hub 5 and generate corresponding signals at the encoder 33. The motor 9 can be energized in a counter phase modulated way in order to counter act the rotor vibrations.

It is, furthermore, possible to evaluate the signals supplied by the acceleration sensors 34, 35, 36. They may indicate rotor blade oscillations before they appear as, hub tension vibrations.

The control device 18 can then control the motor 9 in such a way that these rotor blade oscillations are actively eliminated.

This is possible, if the rotor blades 6 have different characteristic frequencies. Then it is avoided that the counter coupling of one rotor blade vibration causes the excitation of another blade vibrations.

The active elimination of rotational rotor vibrations improves the quality of the power supply which otherwise would suffer by the excitation of rotor blade vibrations and rotational rotor vibrations. The power supply quality can be further improved if the energy storage devices connected to the DC voltage intermediate circuits 26, 27, 28 are utilized. This concerns particularly their use in the compensation for rotor blade vibrations and, respectively rotational rotor vibrations. In addition, power fluctuations of the delivered generator energy can be equalized.

The control system can furthermore be so designed that the electric machine 9 is operated as generator at times when there is a strong wind. In this way, the available generator capacity is increased and the power output of the installation can be increased. With an appropriate control, it is also possible to filter and dampen also short-term torque peaks which are detected by the acceleration sensors 34, 35, 36. It is in this regard also possible to operate the electric machine in rapid sequence alternately as motor or as generator.

With short-term torque peaks, the energy storage devices 29, 30, 31 and possibly 32 can provide for a smoothing of the system energy delivered. In addition, the control unit 18 may include a control circuit which is capable of learning and which optimizes the system. For example, warnings of a central server indicating the arrival of wind gusts could be used to increase the tension or bias in the system by increasing the motor power of the electrical machine 9.

Figure 5:
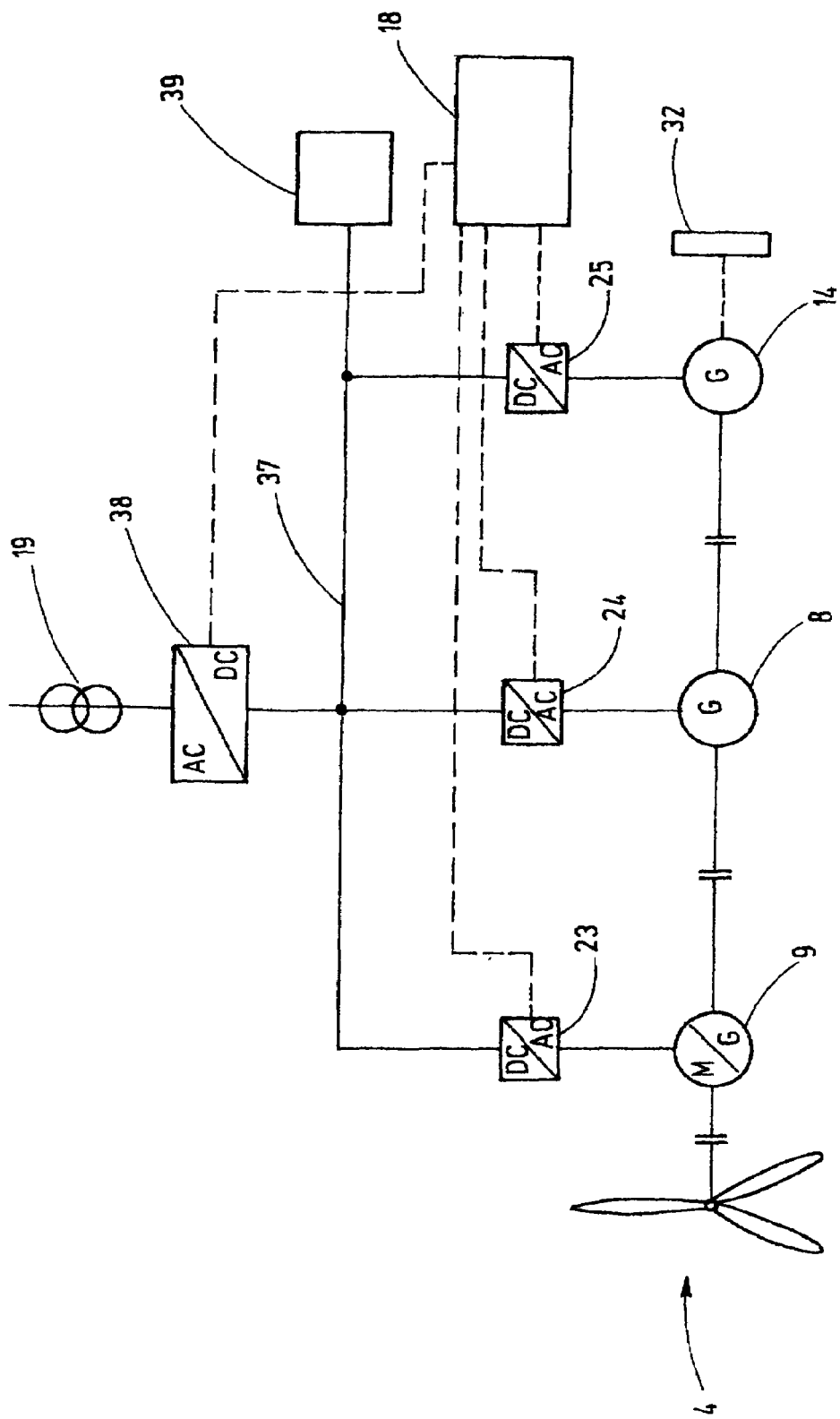

FIG. 5 shows a modified embodiment of the invention, which however, corresponds to a large extent to the arrangement described above to which reference is made for the general description. The differences reside mainly in a common DC voltage intermediate circuit 37 which is connected to the transformer 19 by only a single converter 38. This common DC voltage intermediate circuit is connected to the converters 23, 24, 25. The DC voltage intermediate circuit is connected to an energy storage device 39 which is, for example, a capacitor, battery, or a fly wheel storage device. The whole system is again controlled by the control unit 18. The control principles described earlier may also be used in this case. The motor generator 9 can now be supplied with energy directly from the common DC voltage intermediate circuit 37.

A wind power generation installation 1 comprises a transmission via which at least two electrical machines are coupled to a rotor. One (8) operates as a generator; the other (9) can operate as a generator or as a motor. During motor operation, it provides for a bias of the transmission so as to eliminate the detrimental effects of torque variations which may result in transmission damage. The arrangement permits the use of transmission with relatively coarse toothing and relatively large tooth flank play and at the same time allows the use of a relatively small load for transmission design considerations.

What is claimed is:

1. A wind power generation installation (1), comprising a rotor (4) mounted on a shaft which is rotatably supported, the rotor (4) including rotor blades (6) attached thereto, at least one generator (8, 14) which is operably connected to the rotor (4) by way of a transmission (7);

at least one electric machine (9) which is operable as a motor and which is operably connected to the rotor (4) via the transmission (7); and a control unit (18), wherein the electric machine (9) is controlled by the control unit (18) via which the torque applied by the at least one electric machine (9) to the transmission (7) is controllable, the transmission (7) includes a first transmission branch (12) which interconnects the rotor (4) and the generator (8), and a second transmission branch (11) which interconnects the rotor (4) and the electric machine (9) which is operable as a motor.

2. The wind power generation installation (1) according to claim 1, wherein the control unit (18) adjusts the torque generated by the electric machine (9) such that no torque reversal occurs in the transmission branch (12) leading to generator.

3. The wind power generation installation (1) according to claim 1 wherein the control unit (18) controls the torque generated by the at least one electric machine (9) such that modulations of the power delivered by the at least one generator (8, 14) are minimized.

\* \* \* \* \*